Dec. 1, 1953 R. E. WALKER 2,661,076

AIR-MOISTURE SEPARATOR

Filed Sept. 11, 1951

INVENTOR.
ROBERT E. WALKER
BY Glenn Orlob
AGENT

Patented Dec. 1, 1953 2,661,076

UNITED STATES PATENT OFFICE 2,661,076

AIR-MOISTURE SEPARATOR

Robert E. Walker, Seattle, Wash., assignor to Boeing Airplane Company, Seattle, Wash., a corporation of Delaware Application September 11, 1951, Serial No. 246,060

3 Claims. (Cl. 183—34)

1

This invention relates to the air conditioning and more particularly to an air conditioning apparatus for controlling the amount of entrained moisture and humidity in air or other gas which is to be conditioned.

The purpose of the invention is to provide an apparatus embodying an air-moisture separator which can be employed in a moving air stream to physically separate excessive entrained moisture from air.

It is an object of the invention to provide apparatus of reliable, lightweight, and compact construction for utilization in aircraft installations to reduce fogging within conditioned compartments.

It is an object of the invention to provide apparatus of sufficient capacity for removing moisture from air discharged from air cycle cooling units.

This purpose and accompanying objects are accomplished by the use of apparatus including a separator comprising a component to coalesce moisture, referred to as a fog condenser, to aid in forming water into droplets, a moisture separator impeller to radially separate the droplets of moisture from the air stream, and a turbine drive integral with the separator impeller and driven by the air passing through the apparatus, all assembled within a complementary housing containing and supporting accessories consisting of bearing supports, moisture collectors and a moisture drain.

The inventive features of the apparatus will be more apparent from the following description to be read in conjunction with the accompanying drawings wherein the same parts are identified with like numerals throughout the views.

Figure 1:
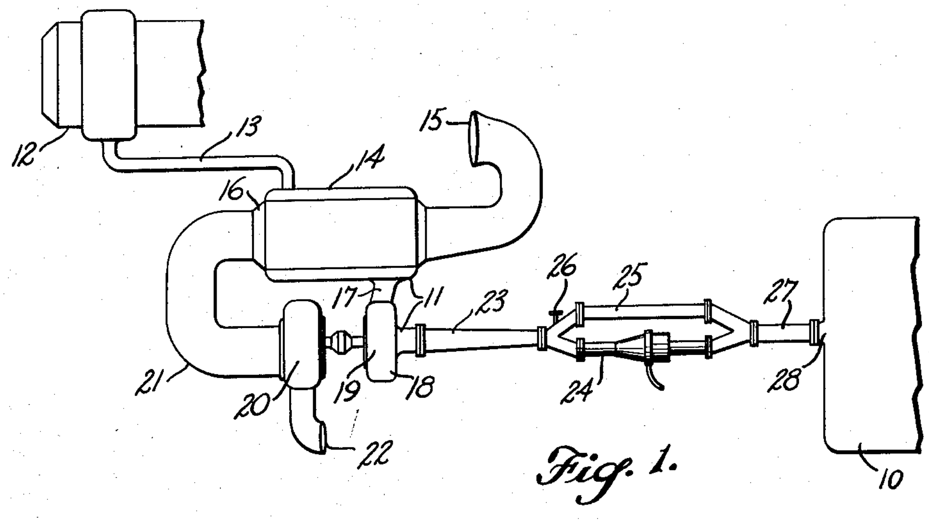
Figure 1 is a schematic illustration of the air conditioning system.

Referring to the drawings, Figure 1 depicts the essential elements of the apparatus that is utilized to produce conditioned air for pressurized and unpressurized compartments 10. The system is designed to employ an air cycle cooling unit 11. The unit receives hot compressed conditioning air withdrawn from an airplane engine 12, through a duct 13, into a primary heat exchanger 14, which receives atmospheric air as the coolant passing through from the entrance 15, to the exit 16. The conditioning air, substantially cooled, passes through a duct 17, to a secondary cooling means employing an expansion turbine 18, to withdraw further energy from the conditioning

2 air obtaining the accompanying desirable cooling effects. The air drives a wheel 19 of the turbine which is interconnected with a driven fan wheel 20, utilized to exhaust the cooling air from the heat exchange 14, entering from duct 21, and leaving from the discharge 22.

The cooled conditioning air is discharged from the air cycle cooling unit 11, through duct 23, into the inventive air-moisture separator 24, or into a by-pass duct 25, depending on the setting of valve 26, and is thereafter discharged into the interior of an airplane cabin 10, through a duct 27, and one or more diffusing orifices 28.

Through the by-pass 25, the cooled conditioning air is passed directly into the compartment 10, with a moisture content substantially identical with that of the atmospheric air. Under many of the operating conditions that prevail this conditioning air contains excessive entrained moisture which is injected into a compartment 10 in microscopic portions creating a dense fog and rain which destroys visibility so completely as to thoroughly disrupt the necessary control operations conducted by the crew members and cause dangerous shorting of electrical circuits.

Figure 2:
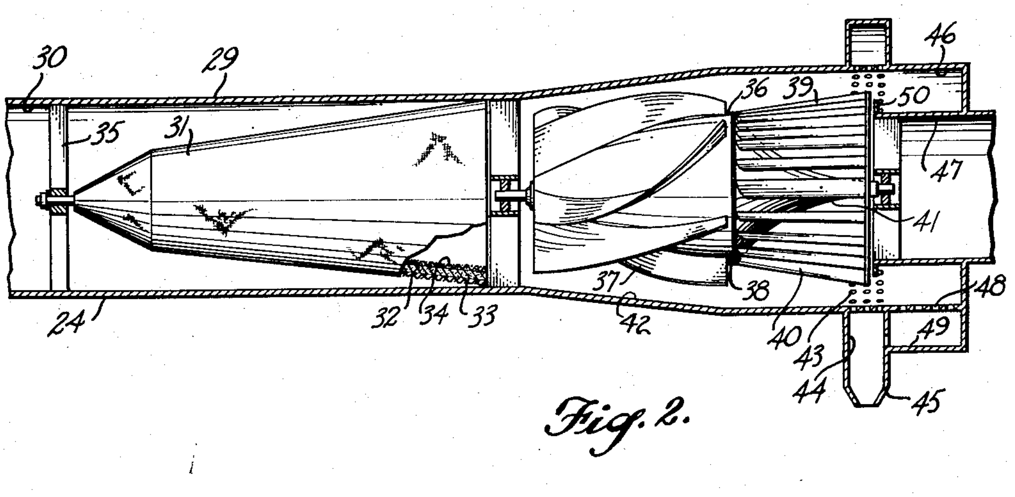
Figure 2 is a sectional view of the air-moisture separator.

With the by-pass 25 closed, the inventive air moisture separator 24 operates to substantially remove the entrained moisture, confining the fog that might still be visible within the compartment 10, to the space immediately surrounding the diffusing orifice 28. The unique operation of the air moisture separator 24, can be better understood by referring to the sectional view of Figure 2. The rapidly flowing, cooled, conditioning air laden with entrained moisture enters the housing 29, at the entrance 30, and passes through the fog condenser or coalescent component 31. It is composed of medium coarse fiber glass 32, covered with fiber glass curtain material 33, and supported by a conical frame 34, manufactured from stainless steel screening. The assembled unit 31 is removably mounted within the housing 29, on a ribbed supporting member 35, and on the housing 29, itself.

Quantities of finely divided particles of entrained moisture collect on the fiber surfaces of this conical mat type unit 31. By this adhesion of the particles to the fiber glass 32, droplets are formed and carried into contact with the revolving blades of the moisture separator impeller 36.

The moisture separator impeller blades 37 are formed with a helical curvature and secured to a conical mounting hub 38. The blades 37 are contoured to throw off or deflect the impinging droplets adding a radial component to their velocity. The rotary motion of the impeller 36 is derived from the adjacent drive turbine 39, with blades 40, and a hub 41, securely fastened to or made integral with the hub 38 of the impeller 36. To obtain the best results in radially or centrifugally separating the droplets, the blades 37 are formed so the impeller 36 is turned by the turbine 39 in a direction opposite to the direction that would result if the hub 38, and the blades 37, were free to rotate in the air stream.

This preferred blade arrangement on the impeller 36, redirects the droplets ejecting them outwardly to the interior shell 42, of the housing 29. Thereafter the droplets tend to travel along the shell surface until reaching apertures 43, which interconnect the housing interior 42, to the moisture collector 44.

The droplets and some air are drawn through the apertures 43, into the collector 44, by the differential in pressure and are discharged through the drain vent 45.

Most of the entrained moisture is separated from the air stream by this ejection of the droplets from the turbulent portion into the less turbulent portion bounding the interior 42, of the housing 29, which directs and carries the droplets over the apertures 43.

The moisture that remains in the air stream is still subject to collection as the direction of the air flow changes abruptly at the turbine blades. These remaining droplets tend to resist this change in flow direction and travel into the outer stream of air which enters the buffer chamber 46, located within the housing 29, around the air discharge 47.

In this chamber 46, the air that enters loses a substantial portion of its kinetic energy and the remaining droplets are propelled to a surface and are separated out passing through the apertures 48, into the chamber collector 49, and out the drain-vent 45. A flange 50 is located on the discharge section 47, near the turbine unit 39, to serve as an additional means of preventing moisture from being carried out of the chamber 46, by the flow of air passing over the flange and flowing radially into the main air discharge 47. The clearance between the flange 50, and the turbine unit 39, is limited presenting an additional block to aid in the separation of the moisture.

With this novel construction the air-moisture separator operates effectively to separate the entrained moisture. By way of example the following values given are typical results, some of which were obtained under test conditions simulating a flight at 10,000 feet altitude on a typical humid summer day. Air enters the compressor at 66° F. under a pressure of 20'' Hg and containing 125 grains of moisture vapor per pound of dry air. After compression, the air temperature is between 500 and 600° F. and the pressure is approximately 100 p. s. i. a. with the moisture content substantially the same. The air cycle cooling unit receives the air and reduces the temperature to approximately 40° F. and the pressure to 15 p. s. i. a. materially affecting the form of the moisture content which is now analyzed as consisting of 44 grains per pound of dry air in the form of vapor and 81 grains per pound of dry air in the form of entrained moisture. The incorporation of the inventive air-moisture separator into the system at this stage results in the withdrawal of approximately 65 grains of entrained moisture per pound of dry air with a minimum of pressure drop so the air enters the compartment at 12 p. s. i. a. and 40° F. with 44 grains per pound of dry air of moisture in vapor form and approximately 16 grains per pound of dry air in entrained moisture. In addition to improving the environment of the compartment, the poor visibility formerly caused by fogging is substantially reduced. When the compartment is warm, the fog in the immediate vicinity of the diffusers is barely detectable.

Having now particularly described and ascertained the nature of my said invention, and in what manner the same is to be performed, I declare that what I claim is:

1. An apparatus for removing entrained moisture from an air conditioning system comprising an insertable flanged tubular housing, an entrance portion of the said housing with a uniform radius, a mid-section of the said housing with a uniformly increasing radii, a discharge section of the said housing having an outer shell of uniform radius and a shorter inner shell of uniform radius centered and supported within the outer shell adjacent to the end of the said housing by a ring shaped abutment forming a buffer chamber, a circumferential collecting chamber around the said outer shell radially opposite the end of the said inner shell and apertures formed in the outer shell, a drain installed at the low point of the said collecting chamber; a fog condenser made of fiber glass materials formed about the exterior of a conical shaped screen frame removably retained within the said entrance portion to condense moisture carried by the incoming air; a moisture separator impellor having helical curved blades integral with a conical hub rotatably mounted in the said mid-section adjacent to and in axial alignment with the said fog condenser to separate radially the condensed droplets of moisture from the air emerging from the said fog condenser directing the droplets toward the inner surfaces of the said mid-section and discharge section for subsequent withdrawal into the said collection chamber as the slower moving boundary layer of air transports the droplets over the said apertures; an air turbine secured to the said separator impellor absorbing the energy of air flow to drive the said separator impellor as the air is expelled through the said inner shell from the said discharge section.

2. An air-moisture separator flanged for insertion into an air conditioning system comprising a tubular housing of three integral sections, the first said section of uniform diameter to conform to the air conditioning system, the second said section of an increasing diameter, the third section of larger uniform diameter, a smaller tubular section centrally mounted within the said third section near its discharge end, a small external flange on the entrance end of the said smaller tubular section, a large external flange on the discharge end of the said smaller tubular section joining the end of the said third section to form a circumferential buffer chamber, a circumferential narrow collecting chamber surrounding the said third section at its midpoint radially opposite the end of the said smaller tubular section and opposite to apertures in the said third section, a drain installed at the low point of the said collecting chamber; a fog condenser formed of fiber glass on the exterior of a conical shaped screen frame removably retained within the said first section to condense moisture carried by the incoming air; a moisture separator impellor having helically curved blades integral with a conical hub rotatably mounted in the said second section with substantial clearance for the said blades and in axial alignment with the said fog condenser to separate radially the condensed droplets of moisture from the air directing them to the inner surface of the midsection into a boundary layer of the air flow; an air turbine attached to the said separator impellor and rotatably mounted in a portion of the said third section closely spaced from the said small external flange of the said smaller tubular section to absorb the air flow energy for driving the said separator impellor as the air passes through the turbine into the said smaller tubular discharge section.

3. An apparatus for removing entrained moisture from an air conditioning system comprising a housing, an entrance portion of the housing, a midsection of the housing of increasing radii, a discharge section of the housing having an outer shell of substantially uniform radius and a shorter inner shell of substantially uniform radius supported within the outer shell adjacent to the end of the housing by an abutment forming a buffer chamber, a circumferential collecting chamber around the outer shell substantially opposite the end of the inner shell, apertures in the outer shell, a drain installed in the collecting chamber; a fog condenser composed of fiber glass materials formed about the exterior of a screen frame removably retained within the entrance portion to condense moisture carried by the incoming air; a moisture separator impellor having blades on a conical hub rotatably mounted in the midsection adjacent to and in axial alignment with the fog condenser to separate radially the condensed droplets of moisture from the air emerging from the fog condenser directing the droplets toward the inner surfaces of the midsection and discharge section for subsequent withdrawal into the collection chamber as the slower moving boundary layer of air transports the droplets over the apertures; in an air turbine secured to the separator impellor absorbing the energy of air flow to drive the separator impellor as the air is expelled through the inner shell from the discharge section.

ROBERT E. WALKER.

References Cited in the file of this patent

UNITED STATES PATENTS

| Number | Name | Date |
|---|---|---|
| 710,626 | Smith | Oct. 7, 1902 |
| 1,530,825 | Grimes | Mar. 29, 1925 |
| 1,909,227 | Shadle | May 16, 1933 |
| 2,209,661 | Pickstone | July 30, 1940 |
| 2,322,110 | Bock | June 15, 1943 |
| 2,634,820 | Anderson et al. | Apr. 14, 1953 |

FOREIGN PATENTS

| Number | Country | Date |
|---|---|---|
| 115,546 | Great Britain | May 16, 1918 |
| 456,468 | Great Britain | Nov. 10, 1936 |